Jan. 1, 1935. T. E. PERKS ET AL 1,986,524
COOKING STOVE
Filed Nov. 27, 1933  2 Sheets-Sheet 1

INVENTORS
T. E. PERKS.
C. E. ROSS
By Blair & Kilcoyne
ATTYS.

Patented Jan. 1, 1935

1,986,524

UNITED STATES PATENT OFFICE 1,986,524

COOKING STOVE

Thomas Edgar Perks and Charles Edward Ross, London, England

Application November 27, 1933, Serial No. 699,986
In Great Britain November 28, 1932

8 Claims. (Cl. 53—7)

This invention relates to a cooking stove comprising a number of suitably heated cooking plates or the like upon which the articles to be cooked are arranged to be supported, and has for its principal object to provide an improved stove of this kind for cooking articles of food, such, for instance, as pancakes, which require to be tossed, turned or moved with respect to the plate in any manner during the cooking process.

According to the principal feature of the invention the cooking plates or the like are arranged to be operated mechanically, electrically, or in any other suitable manner so that the articles being cooked thereon are tossed, turned or otherwise moved with respect to the plates or the like.

According to a further feature of the invention the cooking plates are so disposed with respect to one another and arranged to be operated in any suitable manner that the articles being cooked thereon are transferred from plate to plate, in which case the plates may be maintained at different temperatures so that an article after being cooked on one plate at one temperature for a predetermined time may be transferred to a plate maintained at a different temperature and cooked on that plate for a further period of time.

In accordance with one form of the invention as applied to a stove more particularly suitable for tossing pancakes and the like, the cooking plates are mounted upon rotary shafts, preferably in such a manner that the pivotal axes thereof are substantially in the planes of the lower surfaces of the plates, and are arranged to be successively operated mechanically or by means of electro-magnets, so as to toss the article successively from plate to plate in such a manner as to reverse the article at each tossing operation.

In accordance with a further feature of the invention radiant heat is arranged to be projected downwardly upon the article being cooked more particularly on the first plate so as to facilitate the cooking or at least to seal the upper surface of the article prior to the first tossing or turning operation.

For purposes of shop-window display or other exhibition purposes the stove may be incorporated in a suitable attractive cabinet preferably comprising an oven through which other articles of food may be arranged to pass, while being cooked, on trays carried by a traveling chain or chains, these articles being visible, during the cooking process, through a window provided in the front of the oven. A glazed internally illuminated compartment or compartments may also be provided in the cabinet, in which may be exhibited the ingredients used in the making of the articles being cooked, and a glazed internally illuminated compartment or compartments suitably heated if desired, in which the cooked articles themselves may be displayed, and in accordance with a still further feature of the invention arrangements may be provided for withdrawing the pleasing odor of cooking from the stove and suitably distributing this pleasing odor in order to attract the attention of the passer-by.

In accordance with a still further feature of the invention an illuminated or other indicating device may be located above each cooking plate, these devices being arranged to indicate the direction in which the plate located below will throw the article, or to indicate automatically the particular plate or plates which is or are about to be operated.

In order that the invention may be readily understood it will now be described by way of example, with reference to the accompanying drawings, in which.

Figure 1:
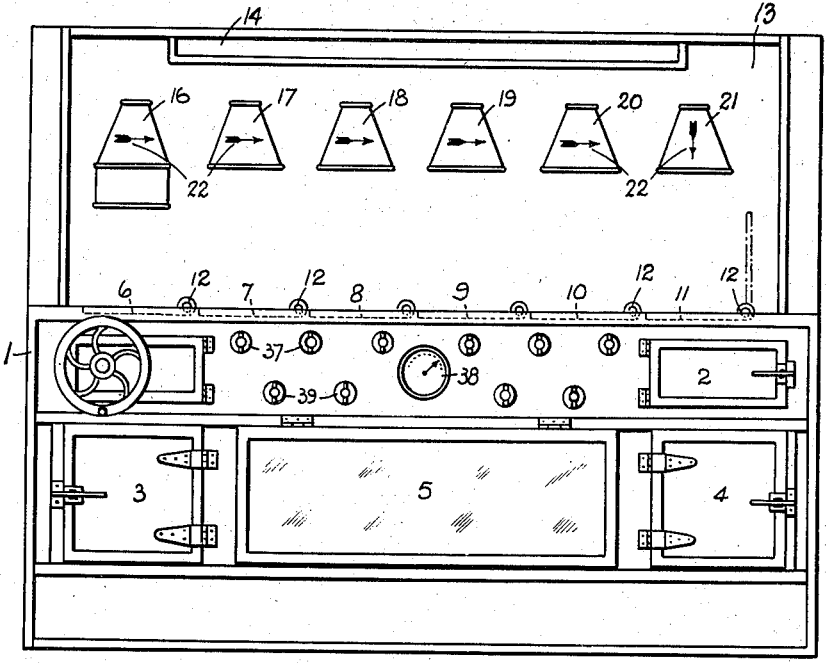
Figure 1 is a front view of the apparatus as a whole.

Referring first to Figure 1, the stove is incorporated in a cabinet 1, for shop-window exhibition purposes, this cabinet being provided with a heated compartment for receiving the cooked articles to which access is obtained through a door 2 provided with a glass panel for inspection purposes. The cabinet also comprises an oven at the lower portion thereof, to which access may be obtained through a door 3 at one end and a door 4 at the other end, a glass panel 5 between these two doors permitting inspection of the articles being cooked in the oven.

The cooking plates 6, 7, 8, 9 and 10 and a plate 11, similar to the said plates, but serving as a lid for the compartment at the right hand end of the cabinet, are arranged adjacent one another in a straight row from the left hand to the right hand side of the stove, each plate being mounted upon a rotary shaft 12 at its right hand side and adapted to be heated by means of a heating element or elements located below.

Extending upwardly from the rear of the cabinet 1 is a shield 13 adapted to receive at 14 an advertising device and carrying a number of hoods 16, 17, 18, 19, 20 and 21, located respectively over the plates 6, 7, 8, 9, 10 and 11. These hoods may be connected by a pipe or pipes to an air pump from which the odor-laden air is delivered by a further pipe or pipes, suitably concealed, to the outside of the shop window where it will attract the attention of the passer-by.

As shown in the drawings illuminated arrows 22 on the hoods 16—21 serve to indicate the direction in which the plate located below will throw the article or permit the article to be thrown as the case may be.

The hood 16 contains a heating device adapted to project a beam of radiant heat upon the upper surface of an article cooking upon the plate 6.

Figure 2:
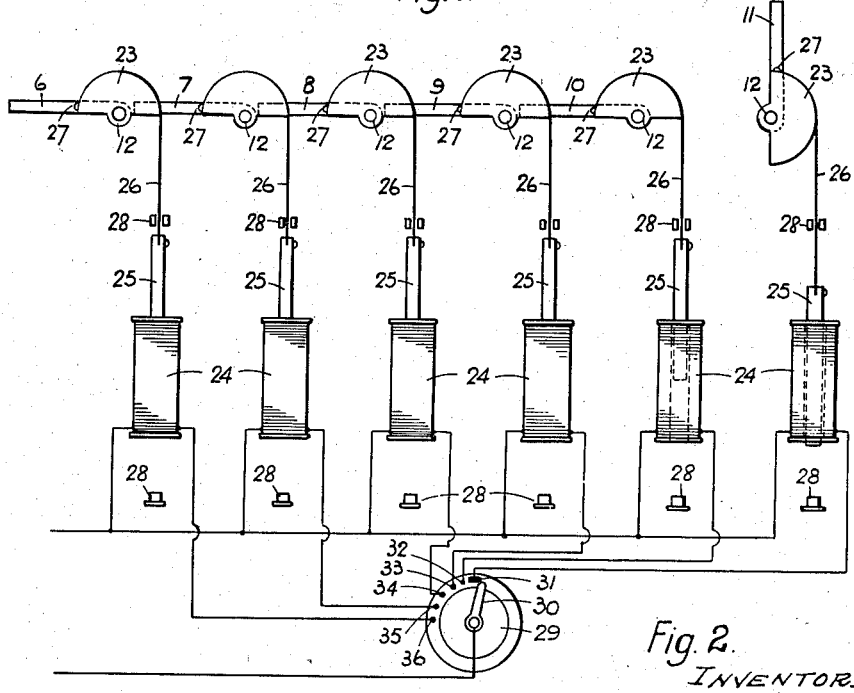
Figure 2 is a partly diagrammatic view showing electrically operated mechanism for actuating the cooking plates.

As shown in Figure 2, upon each rotary shaft 12 of the plates 6—11 is mounted a semi-circular plate 23, each shaft extending through the semi-circular plate mounted thereon substantially at the centre of the straight base of the said plate. Below each cooking plate and preferably at the rear of the stove is mounted an electro-magnet 24, the movable armature 25 of which is coupled to the semi-circular plate 23 on the shaft 12 of the corresponding cooking plate through the intermediary of a chain or other flexible element 26 secured at one end to the armature and at the other end to the semi-circular plate, to the periphery of which the chain or other flexible element is applied, it being understood that the chain or other flexible element is secured to the semi-circular plate at the point 27 of the latter.

While the articles are being cooked on the plates the latter are arranged to be maintained in their horizontal positions by the action of gravity or by means of springs, and when the electro-magnet associated with a cooking plate is energized, the latter is rotated rapidly in a clockwise direction, through the intermediary of the corresponding chain or other flexible element 26 and semi-circular plate 23 mounted upon the shaft 12 carrying the cooking plate, so as to toss the article being cooked on the plate over the shaft 12 on to the next plate which receives it the reverse way up. Each cooking plate is arranged to be rotated in an anti-clockwise direction to its horizontal or cooking position by the action of gravity or by means of a spring as soon as the electro-magnet 24 associated with the plate is deenergized. In order to limit the movement of the armature of the electro-magnet consequent upon energizing and deenergizing the latter suitable stops 28 may be provided which may also serve as buffers and be adjustable as to position, and it may here be stated that the plates may be arranged to be rotated through an angle of approximately 120 degrees to effect the tossing operation.

A rotary switch 29, which may be operated by means of an electric motor or otherwise is provided for controlling the operation of the electro-magnets, this switch being adapted to complete the energizing circuits of the series of electro-magnets in succession from right to left so that the cooking plates are operated in succession and the article thus tossed from plate to plate until it arrives at the plate 10 which is arranged to toss the article into the heated compartment provided with the door 2. This compartment is provided with cover 11 operated in a similar manner to the cooking plates 6—10 but arranged to be operated by the rotary switch prior to the operation of the last plate to toss or throw the article into the heated compartment.

In operation, the arm 30 of the switch 29 is arranged to be rotated in an anti-clockwise direction by means of an electric motor or otherwise and when it engages with contact 31, the electro-magnet 24 associated with the plate 11 is actuated so as rapidly to raise the plate to the position in which it is illustrated. As soon as the arm 30 of the switch 29 engages with the contact 32, whilst still engaging with the contact 31, the cooking plate 10 is rapidly actuated so as to assume a position similar to that of the plate 11 whilst throwing the article cooking on the plate 10 through the aperture uncovered by the plate 11 into the heated compartment provided with the door 2. The arm 30 of the switch 29 now leaves both contacts 31 and 32 with the result that both of the plates reassume their horizontal positions under the action of gravity and as soon as the arm 30 engages with the contact 33 the plate 9 is similarly actuated so as to throw the article cooking thereon on to the plate 10 whilst reversing said article.

The other plates 8, 7 and 6 are actuated in a similar manner as soon as the arm 30 engages with the contacts 34, 35 and 36 respectively.

The speed of the motor driving the switch may be varied as desired to suit different articles of food, but for pancakes it has been found suitable to arrange for the arm 30 to take 10 seconds to travel from contact 31 to contact 36 and 30 seconds to travel from contact 36 to contact 31. Thus the pancakes are cooked for approximately 30 seconds on each plate and the tossing operation or transference from plate to plate whilst reversing the articles takes 10 seconds. The raw material, which may consist, as in the case of pancakes, of a semi-liquid batter, should be placed on the plate 6 directly the latter has been actuated so as to toss the article cooking thereon on to the plate 7, and the top surface of the raw material on the plate 6 is sealed or semi-cooked by the radiant heat projected downwardly upon it from the heating device referred to hereinbefore as located in the hood 16.

It will be evident that by suitably arranging the contacts 31-36 of the rotary switch the intervals of time during which any individual cooking plate remains in the cooking position may be adjusted as desired. Moreover by adjusting the speed of the electric or other motor rotating the switch the period of time required to complete the whole series of tossing operations may be varied as desired.

It may here be mentioned that it is preferable to arrange for the first cooking plate, namely the plate 6, to be heated to a higher temperature than the last plate, the temperatures of the plates 6-10 being arranged to decrease from left to right. The temperatures of the individual plates may be arranged to be controlled by suitable rheostat devices 37 associated with the heating elements located below the plates.

An illuminated or other indicating device may be located above each cooking plate and above the cover of the heated compartment referred to hereinbefore, these devices being arranged to be automatically illuminated or operated to indicate the particular plate or plates which is or are about to be operated, suitable contacts being provided for this purpose in the rotary switch hereinbefore referred to or a preliminary movement of the electro-magnet of the corresponding plate being utilized to this end.

If desired provision may be made for adjusting the position of the pivotal axes with respect to the plane of the tops of the plates so as to enable the nature and the extent of the movement imparted to the article to be adjusted as desired to suit particular requirements.

When the articles being cooked are made from a batter or the like, the batter may be fed to the first cooking plate 6 by hand or by any suitable means such as a suitably controlled pump or a bucket or the like adapted to raise the batter from a container and automatically tip its contents upon the cooking plate; the spreading of the batter over the plate may moreover be arranged to be limited by providing a suitably heated metallic or other ring to be placed on the plate and into which the batter is arranged to be poured, this ring being removed before the first tossing or turning operation is effected.

If desired the movement of the cooking plates when effecting the tossing or turning operation may be utilized automatically to grease the plates, a small quantity of cooking oil being arranged to be released from a suitable reservoir when the plate is operated by the mechanism hereinbefore described. Furthermore the invention is also applicable to stoves for cooking articles in oil, the cooking plates in this case being in the form of grids and slightly immersed in an oil heated in any suitable manner.

The oven located in the lower portion of the cabinet may be heated electrically and comprise traveling chains adapted to cooperate with removable trays on which other articles may be cooked which do not require tossing or turning. The trays when loaded with raw material are placed in the oven through the door 3 and carried through the latter on the traveling chains so as to cook the loads on the trays which can then be removed through the door 4. The temperature of the oven may be indicated on a thermometer 38 and controlled by means of rheostat devices 39.

Figure 3:
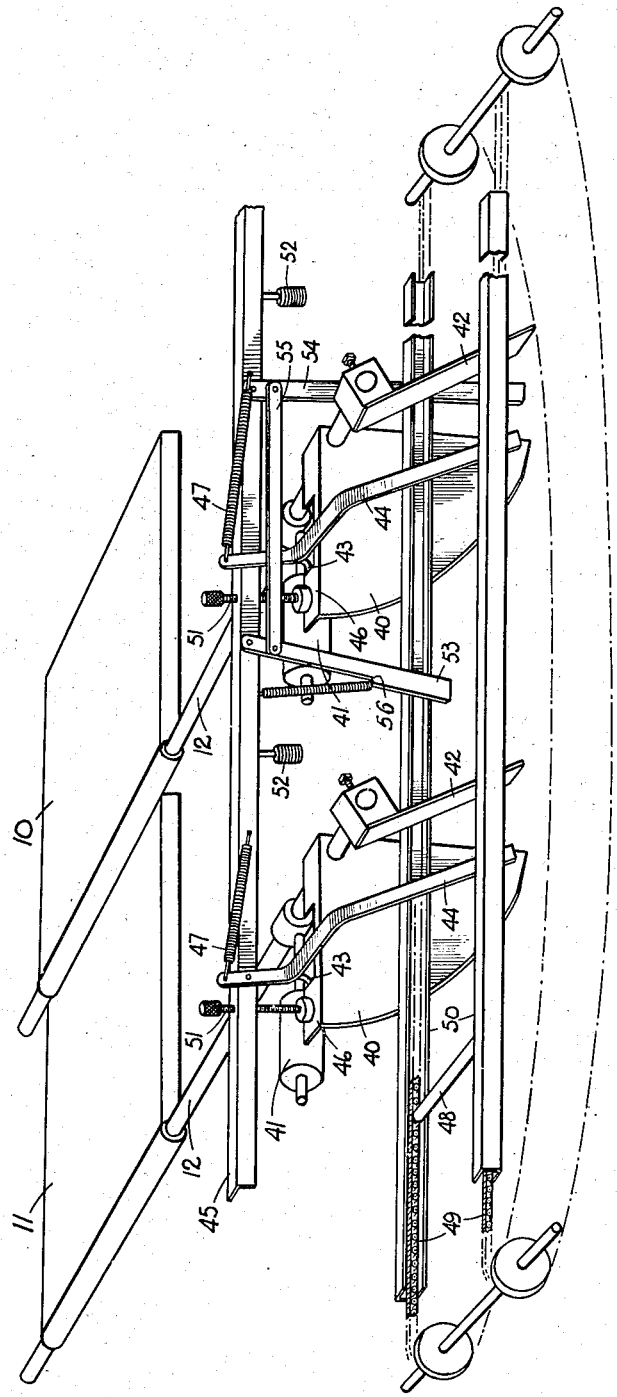
Figure 3 is a perspective view, taken from the rear of the apparatus, of mechanical actuating arrangements for the cooking plates.

The electro-magnetic arrangements for operating the plates described hereinbefore with reference to Figure 2 may be replaced by any other suitable arrangements; for instance the plates may be operated by mechanical means as illustrated in Figure 3.

Referring now to Figure 3 which is a perspective view, taken from the rear of the apparatus, of mechanical actuating arrangements for the cooking plates, each plate is as before carried by a shaft 12 which has secured thereto a quadrant 40 and a counterweight 41 for the plate. The shaft 12 also carries an arm 42. The quadrant 40 is locked in the position in which it is illustrated by a hooked member 43 carried by an arm 44 pivotally mounted on a fixed frame member 45, this hooked member engaging under a flange 46 on the quadrant under the action of a spring 47.

Each plate has similar mechanism associated therewith and is operated in a similar manner and therefore the operation of one plate alone will now be described, although some reference must be made to the operation of the mechanisms associated with the two plates 10 and 11 inasmuch as there is provided an interlocking device between these two mechanisms only in order to ensure that the plate 11 shall remain raised while the plate 10 is operated to toss the article from the plate 10 into the heated compartment, of which the plate 11 constitutes the lid.

In operation a bar 48 secured to two chains 49 arranged to be driven along suitable channel members 50 by means of an electric motor or any other suitable device is arranged to cooperate with the arms 44 and 42 as follows:—The bar 48 travelling from left to right first comes into contact with the arm 44 and moving it in an anti-clockwise direction unlocks the quadrant 40 by removing the hooked member 43 from under the flange 46. The bar then engages with the arm 42 and the impact is sufficient to rotate the shaft 12, quadrant 40 and plate 11 in an anti-clockwise direction, the quadrant 40 leaving an adjustable stop member 51 and engaging with a further such member 52.

In the case of plates 10—6, the shafts are immediately rotated back in a clockwise direction under the action of gravity so as to reassume their initial positions in which the plates are horizontal. In the case of the plate 11, however, a recessed lever member 53 is pivotally mounted on the fixed frame member 45 and is engaged by arm 42 which swings under the impact of bar 48. Consequently, the plate 11 remains in its raised position until after the bar 48 has engaged with the arms 44 and 42 of the mechanism associated with the plate 10 and caused the latter to be operated. After engaging with these arms 44 and 42, the bar 48 engages with a lever 54 which is coupled to the lever 53 by a member 55 and pivotally mounted on the fixed frame member 45, thus moving the recessed lever member 53 in an anti-clockwise direction, so that the arm 42 associated with the plate 11 is released from the recess 56 in the lever member 53 and the said arm and its associated quadrant, shaft 12 and plate 11 reassume their initial positions under the action of gravity.

The stop may be arranged to travel from the first arm 44 associated with plate 11 to the last arm 44 associated with plate 6 in 10 seconds and to return to the first arm 44 associated with plate 11 after another 30 seconds, the chains being carried over a number of rollers to ensure this latter interval of time being obtained.

The counterweights and/or arms 42 may be arranged to be adjustable upon the shafts 12 so as to render possible the adjustment and variation of the movement of the plates as a consequence of the impact of the bar 48 with the arms 42.

It will be evident that the invention is not limited to the particular construction and arrangement of the parts hereinbefore described which may be varied as desired to suit particular requirements without exceeding the scope of the invention.

Having now described our invention, what we claim as new and desire to secure by Letters Patent is:

1. In a cooking stove, the combination with a plurality of rotatable cooking plates, of means for imparting sudden rotary impulses to said plates in succession to toss the articles cooking on said plates freely through the air from plate to plate whilst reversing said articles.

2. In a cooking stove, a plurality of rotatable cooking plates maintained at different temperatures, and means for imparting sudden rotary impulses to said plates in succession to toss the articles cooking on said plates freely through the air from plate to plate whilst reversing said articles.

3. In a cooking stove, the combination with a plurality of cooking plates, of rotary shafts for said plates, semi-circular plates mounted on said shafts, a plurality of electro-magnets, flexible means secured to and bearing on the circumferences of said semi-circular plates and secured to the movable armatures of said electro-magnets, and means for energizing said electro-magnets successively to impart successively sudden rotary impulses to the cooking plates.

4. In a cooking stove, the combination with a plurality of cooking plates, of rotary shafts for said plates, semi-circular plates mounted on said shafts, a plurality of electro-magnets, flexible means secured to and bearing on the circumferences of said semi-circular plates and secured to the movable armatures of said electro-magnets, a compartment for receiving the cooked articles, a lid for said compartment, an electro-magnet coupled to said lid, and rotary switch means for energizing said electro-magnets successively to impart successively sudden rotary impulses to the cooking plates and for holding the electro-magnet coupled to the lid energized whilst the electro-magnet coupled to the next adjacent cooking plate is energized.

5. In a cooking stove, the combination with a plurality of cooking plates, of rotary shafts for said plates, arms on said shafts, and continuously and rapidly travelling means impacting successively with said arms to impart successively sudden rotary impulses to said plates to project the articles thereon freely through the air from plate to plate whilst reversing said articles.

6. In a cooking stove, the combination with a plurality of rotatable cooking plates, of rotary shafts for said plates, arms on said shafts, quadrants on said shafts, latching means cooperating with said quadrants and continuously and rapidly travelling means impacting successively with said latching means and said arms to unlatch the plates and impart successively sudden rotary impulses to said plates to project the articles thereon freely through the air from plate to plate whilst reversing the articles.

7. In a cooking stove, the combination with a plurality of cooking plates, of rotary shafts for said plates, counterweights for the cooking plates mounted on said rotary shafts, arms on said shafts, and continuously and rapidly travelling means impacting successively with said arms to impart successively sudden rotary impulses to said plates to project the articles thereon freely through the air from plate to plate whilst reversing said articles.

8. In a cooking stove, the combination with a plurality of rotatable cooking plates, of means for imparting sudden rotary impulses to said plates in succession to toss the articles cooking on said plates freely through the air from plate to plate whilst reversing said articles and means for projecting radiant heat downwardly upon the articles being cooked prior to the first tossing operation.

THOMAS EDGAR PERKS.
CHARLES EDWARD ROSS.